C. R. EDWARDS.
MOTOR.
APPLICATION FILED JUNE 5, 1916.

1,287,268.

Patented Dec. 10, 1918.
4 SHEETS—SHEET 1.

INVENTOR.
Charles R. Edwards
BY
ATTORNEYS.

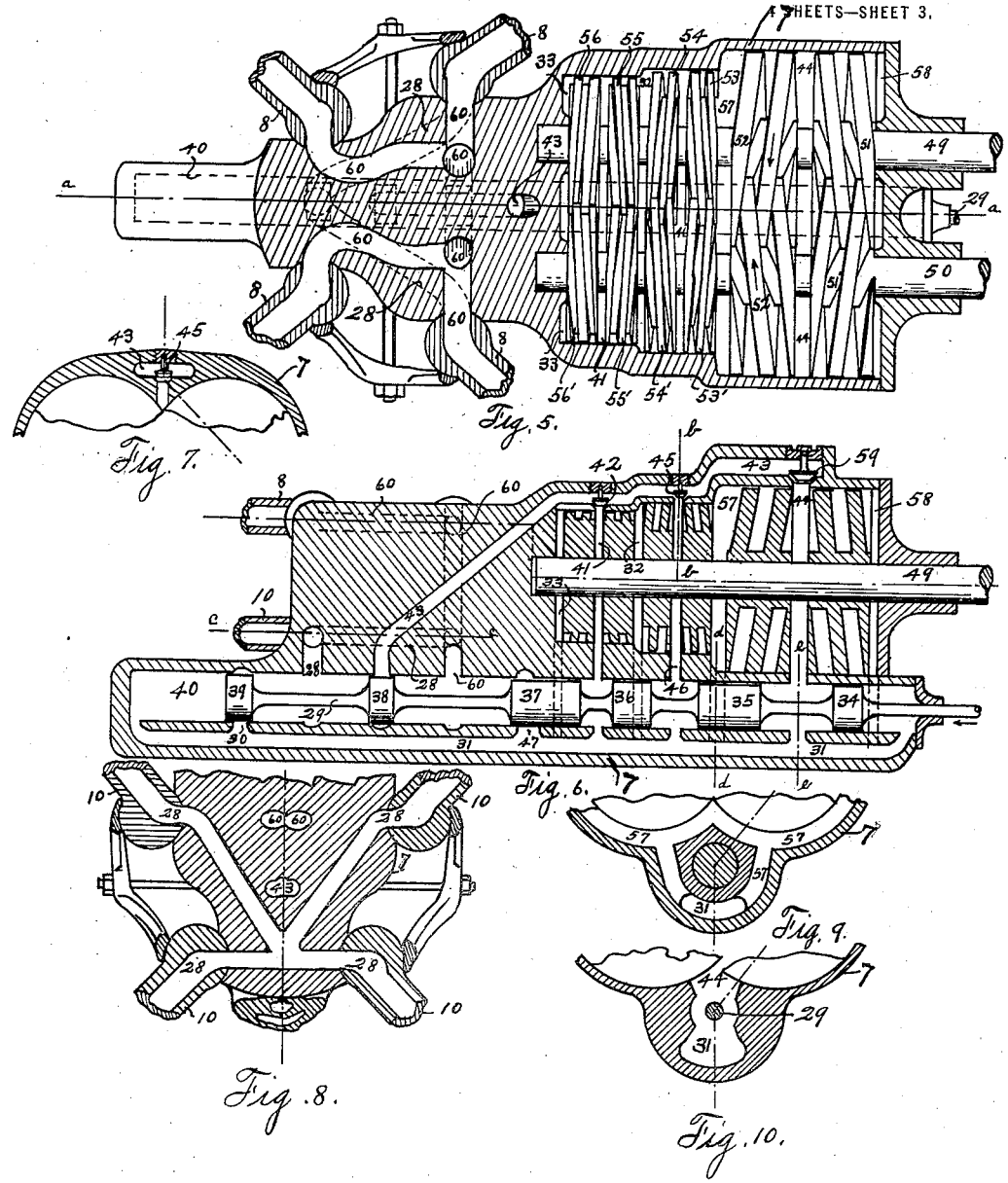

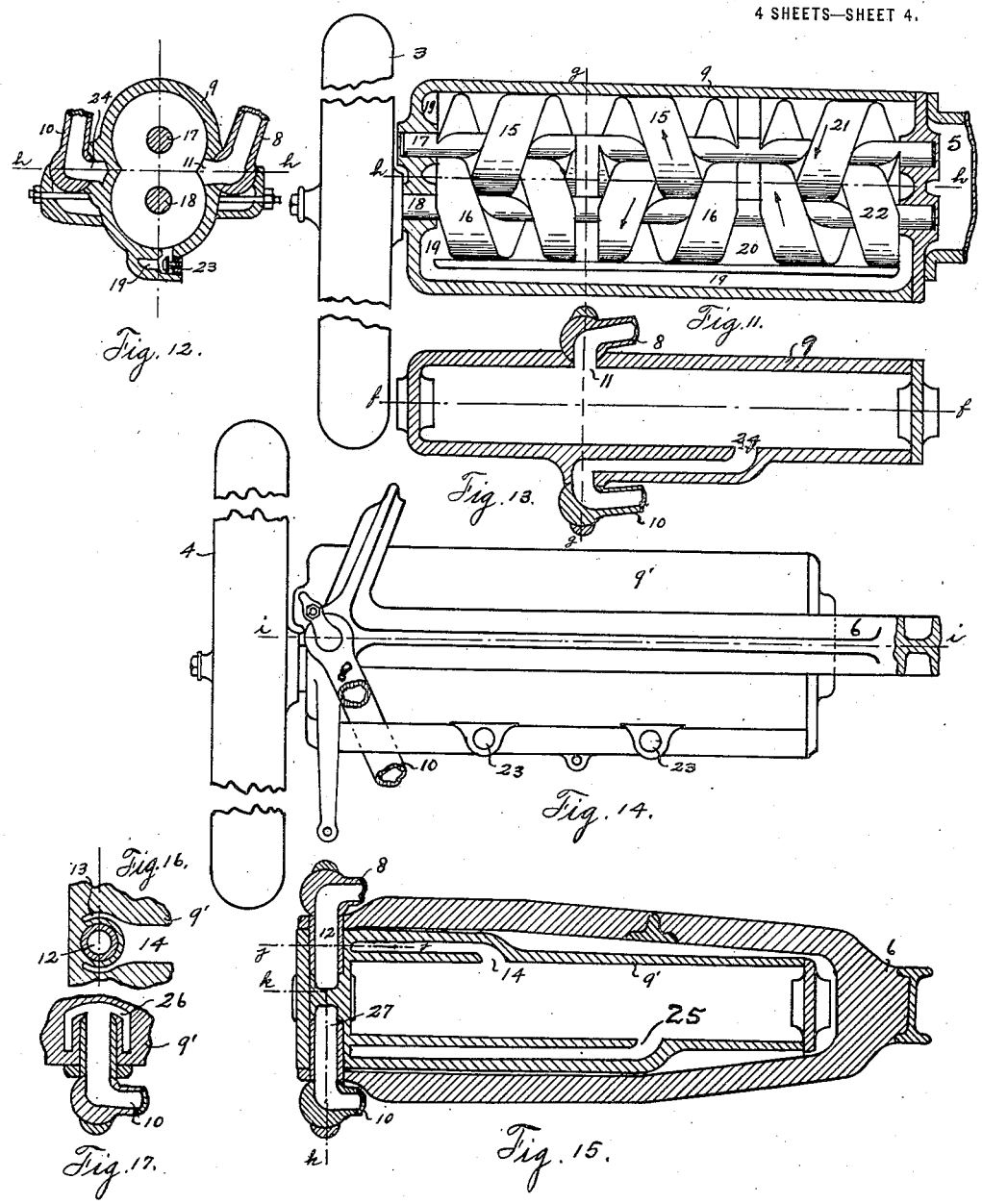

UNITED STATES PATENT OFFICE.

CHARLES R. EDWARDS, OF HOUSTON, TEXAS.

MOTOR.

1,287,268.  Specification of Letters Patent.  Patented Dec. 10, 1918.

Application filed June 5, 1916. Serial No. 101,676.

*To all whom it may concern:*

Be it known that I, CHARLES R. EDWARDS, a citizen of the United States, residing at Houston, in the county of Harris and State of Texas, have invented certain new and useful Improvements in Motors, of which the following is a specification.

This invention relates to new and useful improvements in a motor and has more particular relation to a mechanism for driving vehicles and the like, although it is adapted to be used as a driving means wherever motive power is required.

With the above and other objects in view the invention has particular relation to certain novel features of construction, operation and arrangement of parts, an example of which is given in this specification and illustrated in the accompanying drawings, wherein:

Fig. 5 is a horizontal sectional view of the generator,

Fig. 6 is a vertical sectional view thereof taken on the line *a—a* of Fig. 5,

Fig. 7 is a fragmentary transverse sectional view taken on the line *b—b* of Fig. 6, Fig. 8 is a fragmentary horizontal sectional view thereof taken on the line *c—c* of Fig. 6, Fig. 9 is a fragmentary transverse sectional view taken on the line *d—d* of Fig. 6, Fig. 10 is a fragmentary transverse sectional view taken on the line *e—e* of Fig. 6, Fig. 11 is a plan view of the hydraulic motor connected to the right rear vehicle wheel showing the housing thereof in section taken on the line *f—f* of Fig. 13, Fig. 12 is a vertical sectional view thereof taken on the line *g—g* of Figs. 11 and 13.

Fig. 13 is a vertical sectional view of the housing taken on the line *h—h* of Figs 11 and 12, Fig. 14 is a plan view connected to the left front vehicle wheel showing said motor connected to the vehicle front axle, Fig. 15 is a vertical sectional view thereof taken on the line *i—i* of Fig. 14.

Figure 18:
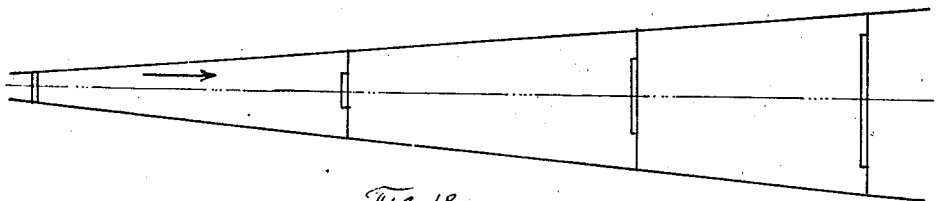
Figure 19:
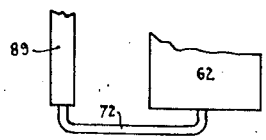

Fig. 16 is a fragmentary sectional view taken on the line *j—j* of Fig. 15,

Fig. 17 is a fragmentary vertical sectional view taken on the line *k—k* of Fig. 15, Fig. 18 is a diagrammatic illustration of a frusto conical shaped cylinder shown for the purpose of illustrating the principle of the invention, and Fig. 19 is a fragmentary view of the cooling fluid circulating system.

Referring now more particularly to the drawings, wherein like numerals of reference designate similar parts, in each of the figures, the numeral 1 refers to the main frame of an automobile chassis, having the transverse supporting bar 2. The numerals 3, 3 and 4, 4 refer respectively, to the rear and front wheels which support the rear and front axles 5 and 6. A generator 7, is provided, which is supported by the frame of the vehicle and from this generator motive fluid is driven through the pipes 8, 8, 8, 8, to the hydraulic motors 9, 9, 9', 9', and is returned to said generator through the pipes 10, 10, 10, 10. These motors 9 and 9' are supported by the respective rear and front axles and are operatively connected with and drive the wheels 3 and 4.

The hydraulic motors 9 and 9' are provided with fluid passage-ways 11, as shown in Figs. 12 and 13, and also the fluid passage-ways 12, 13 and 14, as shown in Figs. 15 and 16. Fixed upon parallel shafts 17 and 18 are the respective rotors 15, 15, and 16, 16, said shafts being rotatable in suitable bearings in the ends of the housings of the motors 9 and 9', said housings fitting closely around the rotors; and one end of the shaft 18 is extended and the corresponding carrier wheel is driven thereby. The opposing rotors 15 and 16 are formed of intermeshing threads or spirals which are arranged in series, the spirals of each series inclining in opposite directions from the corresponding spirals of the adjacent series. Fixed upon the shafts 17 and 18 are also the rotors 21 and 22, formed of intermeshing spirals spaced a distance from the adjacent rotors 15 and 16, inclining in an opposite direction therefrom and forming the intervening space 20. At the opposite end of the housing is a space 19 formed to receive the motive fluid and this space is extended forming a passageway through which the motive fluid is conducted to the opposite end of the housing and thence through the rotors 21 and 22 into the space 20. A check valve 23 is provided as shown in Fig. 12, controlling a passageway entering the space 20 directly from the space 19 so that should the oil in the space 19 have more pressure than that in space 20, said valve will open and permit the escape of the excessive pressure therethrough into the space 20 rather than through the end bearing of the housing. The housing of the motor 9 is provided with a passageway 24 as shown in Figs. 12 and 13 and the housing of the motor 9' is provided with passageways 25, 26 and 27, as shown in Figs. 15 and 17, through which the motive fluid passes into the pipes 10 through which it is returned to the generator 7. The generator 7 is provided with oppositely arranged conduits 28 through which the pipes 10 on each side are connected, said conduits being controlled by the valve 29, which is actuated by the hand lever 48, mounted on the steering wheel. The generator is also provided with a port 30, a fluid chamber 31 and fluid spaces 32 and 33. The valve 29 is formed with enlarged portions 34, 35, 36, 37, and 38 spaced the required distance apart and fitting closely within the cylindrical chamber 40, formed in the housing of the generator.

The numerals 49 and 50, respectively, refer to shafts which are rotatably mounted in suitable bearings in the ends of the housing of the generator 7 and fixed thereon are the rotors 52, 52', 53, 53', 54, 54', 55, 55', 56, 56', the rotors 51, 52, 53, 54, 55, and 56 being fixed on the shaft 49 and the rotors 51', 52', 53', 54', 55', and 56', being arranged opposite those first mentioned, respectively, and fixed on the shaft 50, said opposing rotors being provided with peripheral spirals or threads which intermesh and are spaced apart providing the spaces 44, 46, and 41 and the spirals of each rotor inclining in a direction the opposite of those on either side. The space 41 is controlled by a check valve 42 through which the fluid may pass into the passageway 43 and a check valve 45 is provided to control the space 46 through which the fluid flows from the space 46 into the passageway 43. Spaces 32 and 33 are provided on opposite sides of the rotors 55, 55', 56, 56' and the fluid spaces 57 and 58 are provided on opposite sides of the rotors 51, 51', and 52, 52', said spaces being connected with the fluid chamber 31, as shown in Fig. 9. A check valve 59 is provided to control the passage of fluid from the space 44 into the passageway 43. This last mentioned passageway normally communicates with the chamber 40 but on forward movement communicates with the conduits 60 and on reverse is opened into the passageways 28. The conduits 60 are oppositely disposed and connect the pipes 8, 8, on each side, but upon reverse open through the port 47 into the chamber 31.

Figure 1:
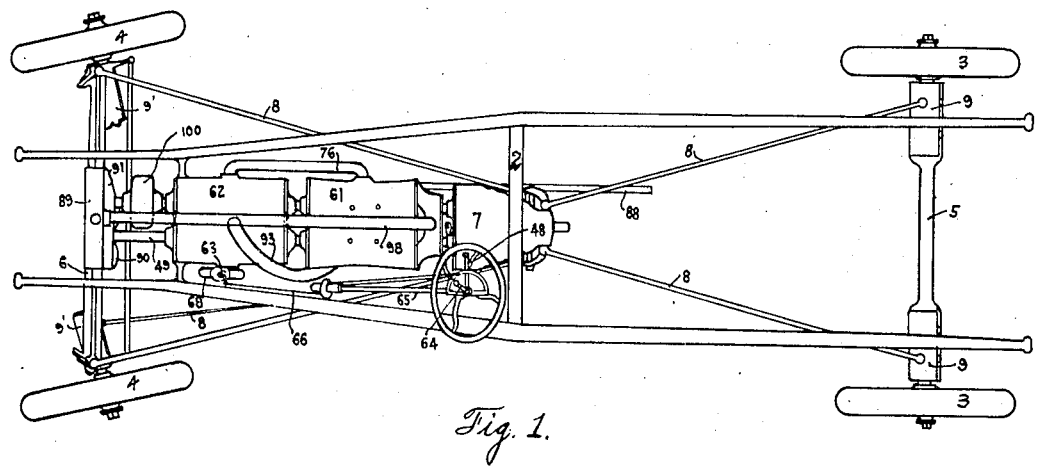
Figure 1 is a plan view of a motor vehicle equipped with the driving mechanism hereinafter explained.
Figure 2:
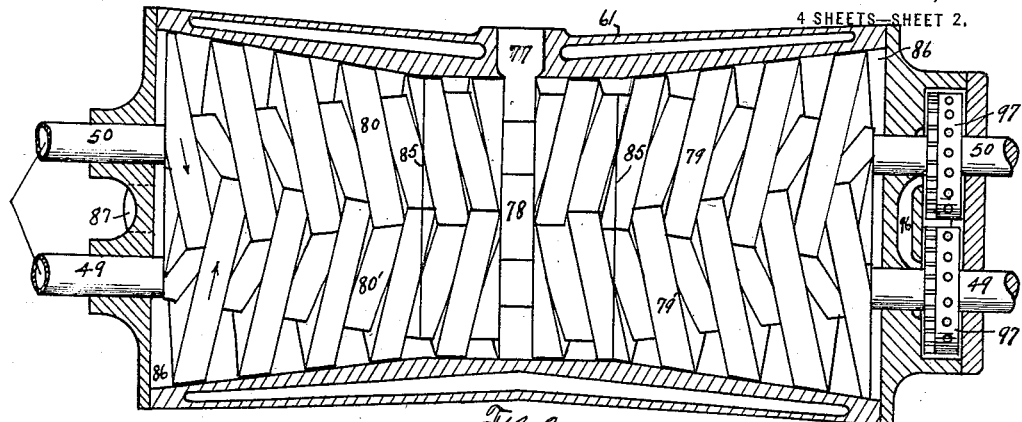
Fig. 2 shows a plan view of the motor showing the housing in section.

The generator hereinbefore described is driven by means of a motor 61 in connection with a compressor 62, shown in the position usually occupied by the motor of the ordinary automobile. In connection with the compressor is a carbureter controlled from the hand lever 64, on the steering post 65, through the reach rod 66 in the usual manner. From the carbureter, the mixture is conducted through a branch pipe 68 to the intake ports 69, 69 in each end of the compressor. Fixed upon the respective shafts 50 and 49, which have bearings also in the ends of the housing of the compressor, are the compressor spirals 70, 71, and 70', 71', the threads of the spirals 70 and 71 being inclined in opposite directions and likewise the threads 70' and 71', said threads 70, 70' and also the threads 71, 71' intermeshing and the inclination being such that the mixture will be gathered up and forced toward the central space 74, provided between the compressor spirals. The housing of the compressor gradually tapers at each end toward this space 74, the spirals having a corresponding taper and fitting snugly within the housing. This construction provides separate gas tight compartments between the threads, said compartments diminishing in capacity from the outer end to the inner end of each rotor. The space 74 has an outlet opening 75 connected to which is a pipe 76 through which the compressed gas passes into the motor being delivered thereto through the port 77 into the space 78, within the motor housing and between the rotors 79, 80 and 79', 80' thereof. These rotors are spaced apart and fixed upon the respective shafts 50 and 49 which extend through the housing of the motor 61 and have bearings in the ends thereof. The rotors 79, 79' and 80, 80' revolve in the direction indicated by the arrows in Fig. 2, forcing the compressed gas from the space 78 outwardly toward the ends of the motor said spirals coacting to close behind each charge. An electric spark plug 83 is so located as to ignite the compressed gas in the isolated spaces 84 causing combustion. At the opposite ends of the motor housing are the spaces 86, 86 to receive the expended gases which are discharged therefrom through the exhaust pipe 88, shown in Fig. 1. It is to be noted that the shafts 49 and 50 extend through the compressor, motor, and generator and have bearings in the respective housings thereof, forming these elements into a power unit.

A cooling system has been provided involving a radiator 89 of the usual design. A fan 90, mounted upon the shaft 50, is arranged near the lower left hand part of said radiator and the air that is drawn through the radiator is directed toward the fan by the housing 91, said fan assisting in keeping the radiator cool. The cooling fluid from the bottom of the radiator passes from the pipe 72 into the fluid chamber 92, within the housing of the compressor 62, thus cooling the walls thereof and passing out through the pipe 93, shown in Fig. 1, and back under the motor 61 through the opening 94 to the water spaces 95 provided in the motor housing. The cooling fluid passes thence out of the rear end of said motor through the openings 96 to the centrifugal pumps 97, 97, mounted upon and operated by the shafts 49 and 50 and by said pumps the fluid is forced back through the pipe 98 to the top of the radiator.

Figure 3:
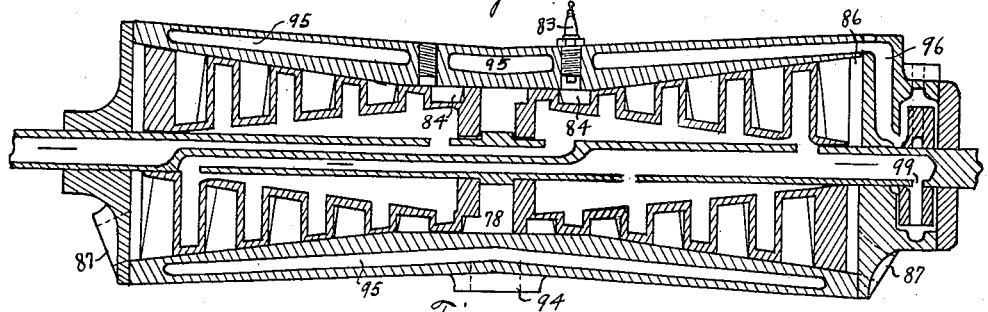
Fig. 3 shows a vertical sectional view thereof.
Figure 4:
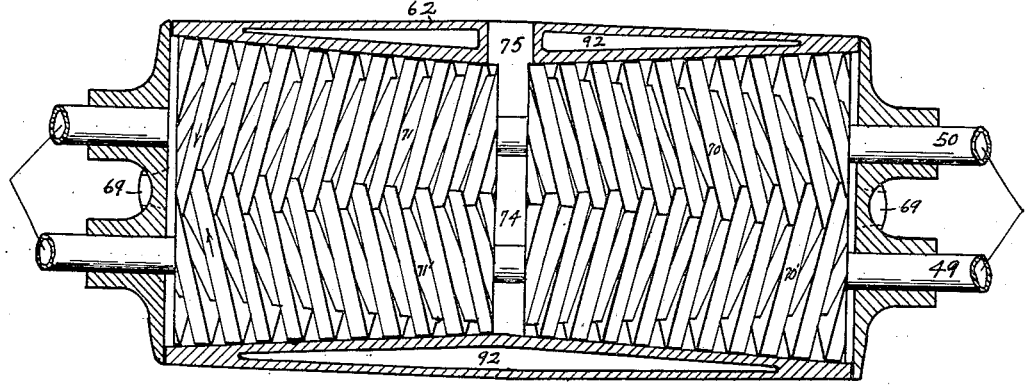
Fig. 4 is a plan view of the compressor showing the housing in section.

A part of the fluid is taken from the bottom of the radiator, through the shafts 49 and 50, and passes into the spirals 70, 70' and 71, 71, which are constructed hollow in the same manner as illustrated in Fig. 3. The fluid circulating through said hollow spirals passes through suitable orifices provided in the shafts on through the rotors 79, 79', and 80, 80' which are also constructed hollow as illustrated in Fig. 3, and is discharged from said shafts through orifices 99 and to pumps hereinbefore referred to and thence is returned to the radiator through the pipe 98. The numeral 100 indicates an electric unit, shown in operative connection with the shaft 49, and suitable for generating current and starting the motor 61.

The hydraulic motors 9', 9' have a pivotal connection with the front axle as shown in Figs. 14 to 17 inclusive so as to permit the steering of the vehicle. The particular method of connecting these motors to the axle is not essential as any method found practical may be employed.

As shown in Fig. 6 the generator is in neutral position and the hydraulic motors 9, 9, 9', 9', are locked against movement, as the passageways 28 and the conduits 60 are closed by the sections 37, 38, and 39 of the valve 29. While the generator is running either in neutral position or at any rate of speed, the fluid flows, by suction, from the chamber 31, shown in Fig. 9, into the spaces 32, 33, 57, and 58, of the generator as shown in Fig. 6.

In order to move the vehicle forward at first speed, the valve 29 is moved in the direction indicated by the arrow in Fig. 6 until sections 38 and 39 open the passageway 43 and the port 39, respectively, and the section 36 of said valve blocks the communication of space 41 with the chamber 31; the valve, however, is not moved far enough for the sections 35 and 34, thereof, to block the communication of the spaces 46 and 44, respectively, with the chamber 31. The fluid will now be forced from the space 41, through the valve 42 into the passageway 43 and thence into the conduit 60 and out through the pipes 8, 8, 8, 8, to the hydraulic motors 9, 9, 9', 9', entering the motors 9, 9, through the passageway 11, as shown in Figs. 12 and 13, and entering the motors 9' and 9' through the passageways 12, 13, and 14, as shown in Figs. 15 and 16. The fluid enters the spaces between the rotors 15, 15, and 16, 16, and is forced axially each way, causing the rotors 15 and 16 to turn, in the direction indicated by the arrows in Fig. 11. The fluid moving each way enters the passageway 19 at the end of the motor housing, and the space 20 between the rotors 21 and 22 and the adjacent rotors 15 and 16. The fluid entering the passageway 19 passes thence to the opposite end of the motor housing and through the rotors 21 and 22 into the space 20. From the space 20 the fluid passes through passageway 24, of the rear motors 9, 9, and through the passageways 25, 26, 27, of the front motors 9', 9', and thence through the pipes 10, 10, 10, 10, back to the passageways 28, of the generator shown in Figs. 6, and 8 and thence through the valve chamber 40, through port 30 into the chamber 31 and thence to the fluid spaces 32 and 33, as shown in Fig. 6. This fluid is then forced into the space 41 by the rotors 55, 55' and 56, 56'.

In order to increase the speed of the generator to second speed the valve 29 is moved farther in the direction indicated by the arrow in Fig. 6, and the section 35 of the valve blocks the communication of the space 46 with the chamber 31 forcing the fluid in space 46 through the check valve 45 into the passageway 43 and thereby adding to the volume of fluid flowing into the passageway 43 from the space 41. From the space 43 the volume of fluid, to, through and from the hydraulic motors 9, 9, 9', 9', and back to chamber 31 is the same as hereinbefore described, the increased flow of fluid increasing the speed.

In order to attain third speed forward a further movement of the valve 29, in the direction indicated by the arrow, is effected, causing the section 34 of the valve to block the communication of the space 44 with the chamber 31, forcing the fluid in the space 44 out through the check valve 59 and into the passageway 43, thus adding more volume to the fluid in said passageway resulting in an increased flow of fluid and an increase of speed.

In order to return to neutral the valve 29 is gradually moved backward from the position last above mentioned opening consecutively the spaces 44, 46, 41, into the chamber 31, thus gradually reducing the flow of fluid into the space 43. The valve movement should be stopped before the sections 38 and 39 close the passageway 28, the conduit 60, the port 30, so that the fluid may flow freely in through the passageway 28, the valve chamber 40 and through the port 30 into the chamber 31, and thence through the spaces 44, 46, and 41, and into the passageway 43, and thence back into the valve chamber 40 and out through the conduits 60 and through the motors 9, 9, 9', 9'. The vehicle is thus in coasting position, the fluid being forced along by the motors last mentioned.

For the purpose of locking the hydraulic motors the valve 29 should be moved farther backward gradually so as to close the passageway 49, and port 30, thus stopping the flow of fluid through the passageways 28 and locking the hydraulic motors 9, 9, 9', 9', against rotation, as is shown in Fig. 6.

In order to reverse the flow of fluid, and thus reverse the movement of the vehicle, the valve should be moved from the position shown in Fig. 6 in the direction the opposite of that indicated by the arrow in said figure, until the section 38 of the valve opens the passageway 43, and section 37 of the valve opens port 47, and blocks the space 41 from communication with the chamber 31, thus forcing the fluid into the passageway 43 in the manner herein explained relative to the forward movement. From the passageway 43 the fluid enters the chamber 40 behind section 38, which section blocks its flow into the conduits 60, but permits the fluid to flow into the passageway 28 and thence out through the pipes 10, 10, 10, 10, and the fluid passes through the motors 9, 9, 9', 9', in exactly reverse direction from that on forward movement, and returns to the generator through the pipes 8, 8, 8, 8.

The operation of the device is as follows: The electrical unit 100 operatively connected with the shaft 49 starts the rotation of said shaft thereby operating the compressor 62 and drawing the motive fluid in through the intake ports 69, 69 compressing the same in the space 74 and forcing the same out through the pipe 76 through the port 77 into the space 78 between the rotors 79, 79' and 80, 80', fixed upon the respective shafts 50 and 49. The rotation of these last mentioned rotors cause the compressed gas to fill the spaces between the spirals thereof, said gases moving from the compression space outwardly toward the end of the rotors, the spirals co-acting to close behind each charge. When an electrical spark from the plug 83, that has just been uncovered by the advancing rotor spiral, ignites the compressed gas mixture in the now isolated spaces 84 and combustion takes place, the temperature and pressure being thereby suddenly increased, the gas exerts pressure against the spirals of the rotors and starts the motor 61. As said rotors continue to rotate, additional charges are taken in and exploded and the exploded gas mixture moves outwardly past the lines 85, 85 shown in Fig. 2. The portion of the interior of the housing between said lines is cylindrical in form, but said housing gradually widens each way beyond said lines and the expansion of the gases against the receding walls reacts against the spirals of the rotors developing great power which turns the shafts 50 and 49, and because the rotors are arranged in pairs securely attached to each shaft and reversely spiraled there will be practically no end thrust exerted against the shafts inasmuch as the end thrust exerted by one of the rotors would be exactly overcome by the end thrust in the opposite direction exerted against the other rotor on the same shaft. The expended gases after leaving the outer ends of the rotors pass into the spaces 86, 86, in the opposite ends of the housing and are discharged through the exhaust ports 87, 87, shown in Figs. 2 and 3, and are exhausted from the pipe 88, shown in Fig. 1. For the purpose of illustration, I have shown, in Fig. 18, a diagrammatic view of a frusto conical shaped cylinder having a plurality of pistons fixed upon a common rod and spaced apart. In this view it is assumed that the pistons move in the direction indicated by the arrow and gradually enlarge so as to constantly fit closely within the cylinder and separate the cylinder into a plurality of compartments. Should an explosion occur in any particular compartment, it is obvious that the back pressure against the smaller piston would be less than the forward pressure against the larger one, resulting in a forward movement of said pistons. The principle illustrated in said figure is utilized in the formation of rotors 79, 79', and 80, 80', wherein the spaces inclosed between the spirals of either rotor and the housing, are, in effect, cylinders which gradually enlarge from the central space 78 outwardly toward the ends of the rotors and the opposing intermeshing spirals for, in effect, pistons, the re-action of the explosion of the cylinders against the pistons causing the rotors to turn as hereinbefore explained.

The shafts 49 and 50 drive the rotors 51, 51', 52, 52', 53, 53', 54, 54', 55, 55', and 56, 56', which are fixed on said respective shafts and thereby force the motive fluid through the pipes 8, 8, 8, 8 on forward movement, said fluid passing through the hydraulic motors 9, 9' and driving them and returning to the generator through the pipes 10, 10, 10, 10, but on reverse, the motive fluid is driven by the generator through the pipes, 10, 10, 10, 10, and through the rotors 9, 9', and is returned through the pipes 8, 8, 8, 8, in the manner and with the effect hereinbefore explained.

A motor constructed as hereinbefore described will be found to be very simple having no pistons, connecting-rods, cranks, crank-shafts, cams, cam-shafts, valves or valve-rods and no gears or chain or friction drives and will have, consequently, fewer parts than motors now in common use; it will also be durable on account of the fact that it has few movable parts and these of such a size as to admit of large bearing surfaces. The motor will also be efficient on account of the small amount of friction and vibration and will have great flexibility on account of the wide range of speeds which may be easily provided for. The motor will also be practically noiseless as there will be no dead-centers the expansion being applied at a tangent all the way around the rotors and no muffler will be required as the exhaust is constant and at atmospheric pressure. The motor can be cheaply constructed and will be economical in that it will require less fuel than motors of equal horsepower now in common use and will also utilize a cheap grade of fuel oil as there are no places for carbon deposits to accumulate and cause trouble.

When applied to a vehicle all four wheels can be readily connected to the motor and additional traction power thus be obtained.

What I claim is:—

1. A device of the character described including a tapering housing, a pair of rotatable members conforming in contour to and fitting snugly within the housing and rotatable on parallel axes, peripheral spiraled threads carried by each member, the threads of the respective members intermeshing.

2. A device of the character described including a housing, having chambers therein for the circulation of a cooling fluid, a pair of hollow rotatable members fitting snugly therein, and rotatable on parallel axes, peripheral spiraled threads carried by said members, said threads intermeshing and conduits communicating with said chambers and the interior of said members respectively.

3. A device of the character described including a housing, having chambers therein for the circulation of a cooling fluid, a pair of tapering hollow rotatable members fitting snugly therein, peripheral spiraled threads carried by said members, said threads being tapered reversely with respect to said members, and intermeshing, conduits communicating with the said chambers and the interior of said members, respectively, and means creating a circulation of said cooling fluid through said conduits, chambers and the interior of said members.

4. A device of the character described including a housing, a pair of conical shaped hollow rotatable members fitting snugly together, and rotatable on parallel axes, peripheral spiraled threads carried by said members, said threads tapering the reverse of said members, and intermeshing, and an inlet and outlet conduit communicating with the interior of the housing through which fluid may be circulated therethrough.

5. A device of the character described including a housing, parallel shafts rotatably mounted therein, a tapering rotor mounted on each shaft, peripheral spiraled threads on each rotor, the threads of said rotors intermeshing from end to end.

6. A device of the character described including a housing, rotatable parallel shafts mounted therein, two reversely tapered rotors mounted on each shaft and fitting snugly within the housing and spaced apart, the rotors of one shaft being arranged opposite, and coacting with, the corresponding rotors of the other shaft, peripheral spiraled threads carried by each rotor, the threads of each rotor being tapered the reverse of said rotor and the threads of the rotors on the same shaft being reversely spiraled and the threads of the opposing rotors intermeshing.

7. A device for generating and transmitting power including a pair of parallel shafts, conical shaped compression rotors mounted thereon, a housing inclosing said rotors, driving rotors also fixed on said shafts a housing inclosing said driving rotors, said rotors having intermeshing spiraled threads, the threads of each rotor being in rolling contact with the surface of the other rotor, said threads coacting to form, successively, inclosed explosion chambers arranged to receive charges of motive fluid from said compression motors, igniting means for igniting said charges, whereby said shafts are rotated, a transmission fluid housing, ducts in communication with said last mentioned housing through which said transmission fluid is applied to the mechanism to be operated thereby, and rotors fixed on said shafts within said last mentioned housing adapted to drive said fluid through said ducts.

8. A device for generating and transmitting power including a pair of parallel shafts, tapering compression rotors and driving rotors mounted on said shafts, housings inclosing said respective rotors, said driving rotors coacting to form with said housing inclosed combustion chambers arranged to receive motive fluid from the compression rotors, igniting means for igniting the charges in said chambers, to cause explosions thereof whereby said rotors and shafts are rotated, a transmission-fluid housing, and means fixed on said shafts within said housing whereby power is transmitted through the fluid in said last mentioned housing.

9. A device for generating and transmitting power including a pair of tapering compression rotors and a pair of tapering driving rotors rotatable on parallel shafts, housings inclosing said respective pairs, said driving rotors coacting to form with said housing inclosed combustion chambers arranged to receive motive fluid from the rotors, igniting means for igniting the charges in said chambers whereby the driving rotors are rotated, power transmitting means upon which the corresponding members of said compression and driving rotors respectively are fixed, a transmission fluid housing and rotors fixed upon said power transmitting means within said last mentioned housing, which coöperate to transmit power through the fluid in said housing.

10. In a device of the character described a housing, a plurality of pairs of tapering rotors therein having parallel axes, said pairs being spaced apart, peripheral spirals carried by each rotor, the spirals of the respective members of each pair completely intermeshing.

In testimony whereof I have signed my name to this specification in the presence of two subscribing witnesses.

CHARLES R. EDWARDS.

Witnesses:
H. LEE,
H. K. HODES.